Jan. 15, 1963 J. J. CUNNINGHAM 3,073,910

AUTOMATIC DIALING ATTACHMENT FOR TELEPHONES

Filed Jan. 19, 1959 5 Sheets-Sheet 1

INVENTOR.
JAMES J. CUNNINGHAM
BY
Carl Miller
ATTORNEY

Jan. 15, 1963 J. J. CUNNINGHAM 3,073,910

AUTOMATIC DIALING ATTACHMENT FOR TELEPHONES

Filed Jan. 19, 1959 5 Sheets-Sheet 2

INVENTOR.
JAMES J. CUNNINGHAM
BY
Carl Miller
ATTORNEY

AUTOMATIC DIALING ATTACHMENT FOR TELEPHONES

Filed Jan. 19, 1959 5 Sheets-Sheet 3

INVENTOR.
JAMES J. CUNNINGHAM
BY
Carl Miller
ATTORNEY

INVENTOR.
JAMES J. CUNNINGHAM
BY
Carl Miller
ATTORNEY

AUTOMATIC DIALING ATTACHMENT FOR TELEPHONES

Filed Jan. 19, 1959 5 Sheets-Sheet 5

INVENTOR.
JAMES J. CUNNINGHAM
BY
Carl Miller
ATTORNEY

United States Patent Office 3,073,910

Patented Jan. 15, 1963

3,073,910

AUTOMATIC DIALING ATTACHMENT FOR TELEPHONES

James J. Cunningham, Jackson Heights, N.Y.

Filed Jan. 19, 1959, Ser. No. 787,397
8 Claims. (Cl. 179—90)

This invention relates to telephones and, more particularly, to dial telephone systems.

Almost every office, home, and business has certain numbers that are frequently called, in which accuracy and time is extremely important, such as when dialing emergency fire, police, and medical numbers. It is therefore an object of the present invention to provide an automatic dialing attachment for dial type telephones that will dial such frequently called numbers in response to a simple actuation of a housing mounted slide.

Another object of the present invention is to provide slide actuated automatic telephone dialing equipment that can be conveniently reset or adjusted in a simple or efficient manner so as to readily change the numbers set to be automatically dialed.

Still another object of the present invention is to provide a virtually foolproof automatic dialing attachment for telephones that will accurately and quickly dial predetermined telephone numbers in response to a single actuating movement.

A further object of the present invention is to provide automatic dialing equipment of the type described that can be conveniently attached to all types of dial telephone equipment and which can be mass produced in large quantities at a relatively low cost.

All of the foregoing and still further objects and advantages of this invention will become apparent from a study of the following specification, taken in connection with the accompanying drawing, wherein.

Figures 1, 2, 3:
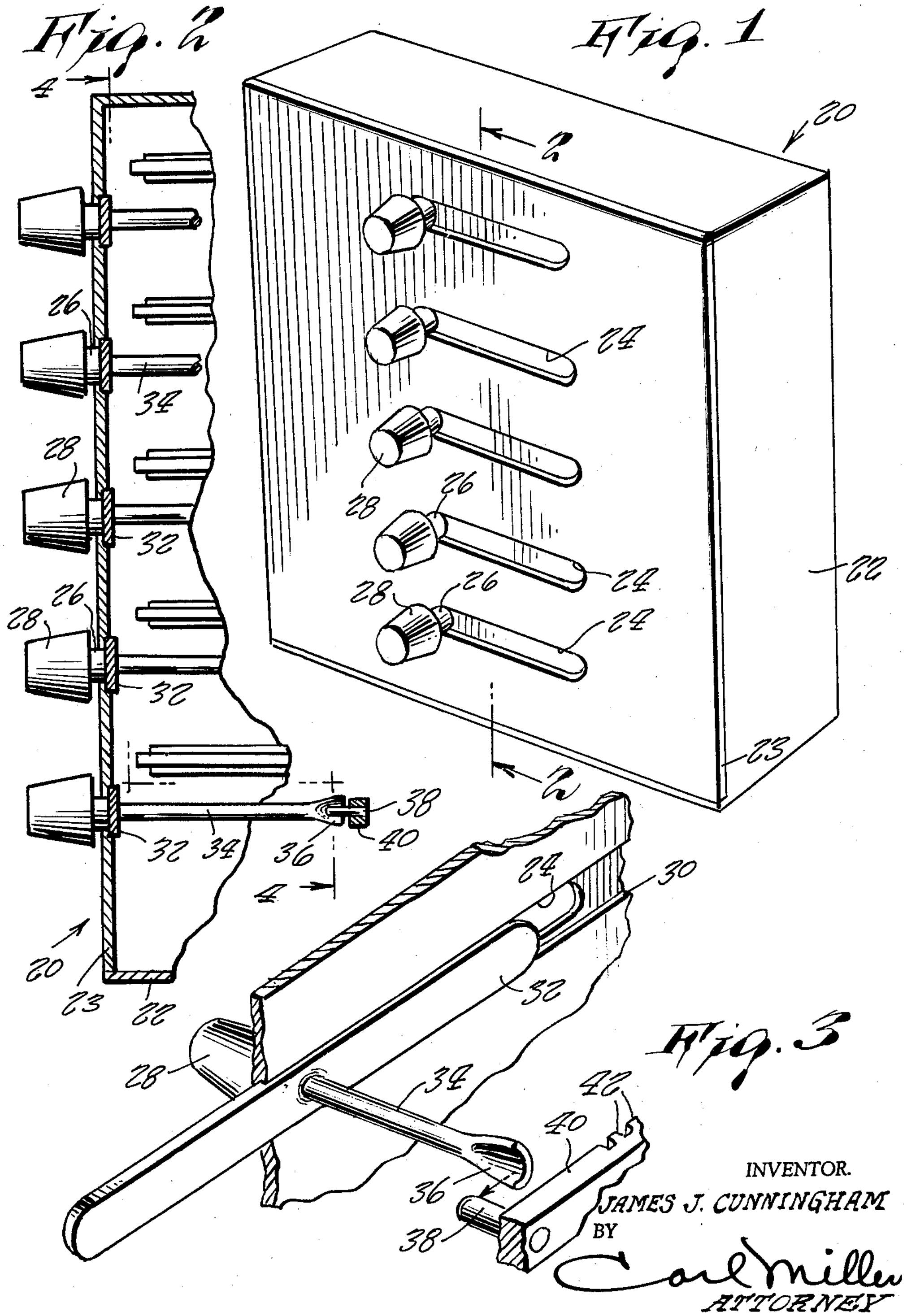
FIGURE 1 is a perspective view of an automatic dialing unit made in accordance with one form of the present invention.
FIGURE 2 is an enlarged fragmentary cross sectional view taken along line 2—2 of FIGURE 1.
FIGURE 3 is an enlarged fragmentary perspective view of certain operating parts of the present invention.

Referring now to the drawing, and more particularly to FIGURES 1 to 3 thereof, an automatic dialing unit 20 for dial telephone systems made in accordance with the present invention is shown to include a housing 22 having a central storage compartment and a closure 23 removably mounted thereupon. The closure 23 is provided with a plurality of spaced apart parallel slots 24 disposed in a side by side parallel relationship, each one of which slidably receives the stem 26 of a knob 28 therethrough. The inside surface of the closure 23 adjacent to each such slot 24 is provided with a longitudinal groove 30 within which a shield 32 is slidably supported for maintaining the slot 24 in a dustproof closed condition at all times. A plunger 34 integral with the slide 32 and knob 28 is provided with a concave spoon-like portion 36 at its innermost end for effecting actuation of gear means also forming a part of the present invention.

Figure 4:
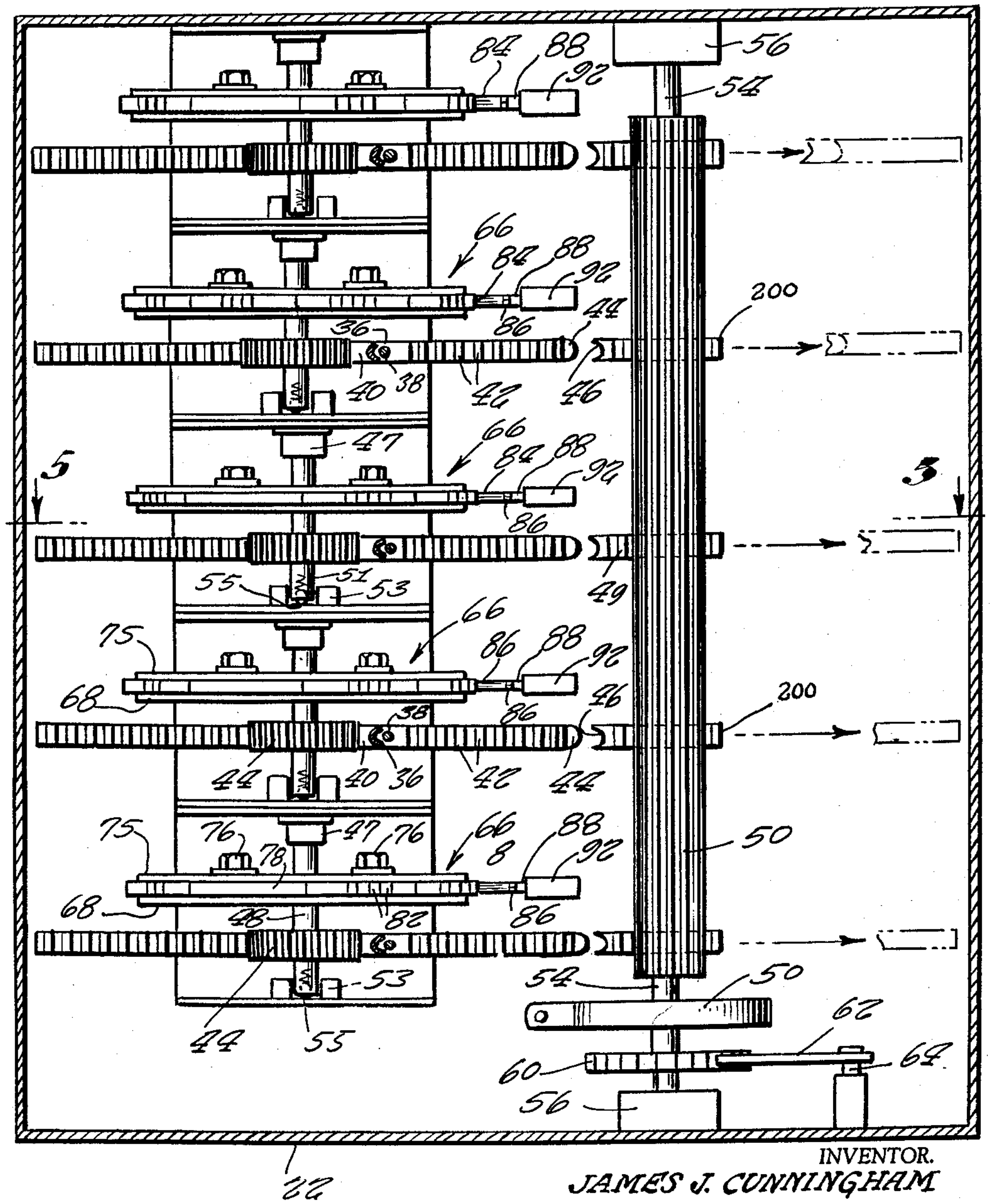
FIGURE 4 is a longitudinal cross sectional view taken along line 4—4 of FIGURE 2.
Figures 5, 6:
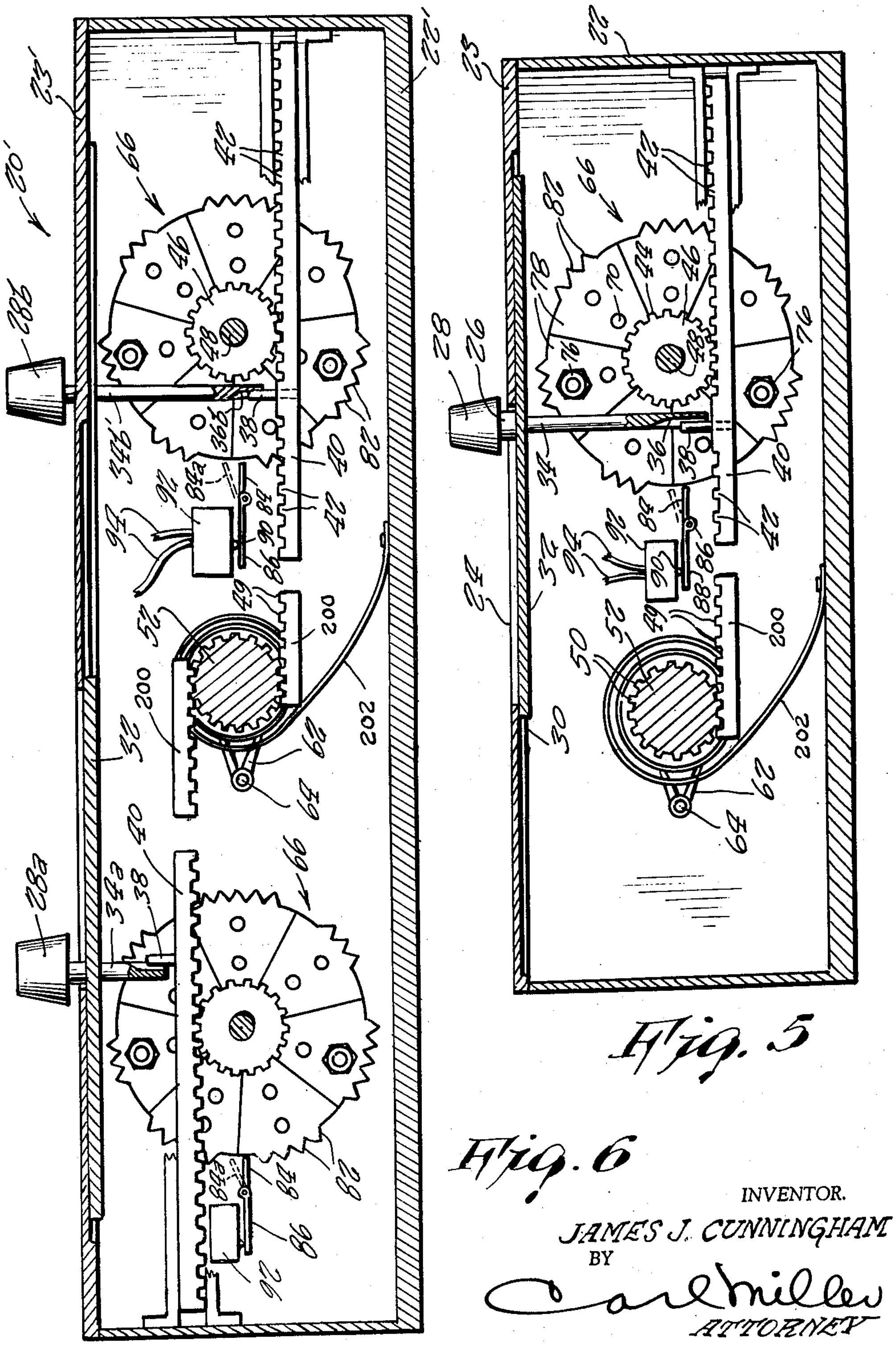
FIGURE 5 is a transverse cross sectional view taken along line 5—5 of FIGURE 4.
FIGURE 6 is a view similar to FIGURE 5, showing a slightly modified arrangement.

With further reference to FIGURES 4 and 5 of the drawing, each linear slide 32 and associated depending plunger 34 is shown to be disposed in alignment with a rack gear 40 that is slidably supported within the housing 22 in any suitable manner. The spoon-like recess 36 of the plunger 34 is shown in facing engagement with a pin 38 integral with the rack gear 40 so as to effect longitudinal movement of the rack gear in response to longitudinal movement of the knob 28 in one direction. The rack gear 40 includes teeth 42 that are in meshing engagement with the teeth 44 of a pinion 46 secured to a transverse shaft 48 upon which a control wheel 66 is also secured.

Another rack gear segment 200 is slidably supported in alignment with the main rack gear 40 to be moved in one direction by the longitudinal movement of the main rack gear 40 in the one direction of movement of the knob 28. The adjacent end 44 of the main rack gear 40 is receivable within the recess 46 in the facing end of the rack gear segment 200, so as to maintain the parts in interlocked engagement during the aforementioned movement of the rack gear 40. The rack gear segment 200 is also provided with teeth 49 that are in constant meshing engament with similar teeth 50 of a cylindrical pinion 52 that is rotatably mounted by means of extensions 54 upon bearings 56 carried by the housing 22. A torsion spring 202 secured at one end to the housing 22 and at the opposite inner end to the cylindrical pinion shaft 54, yieldably resists rotation of the cylindrical pinion 52 in the one direction in which it is urged by the rack gear segment 200 in response to the movement of the associated knob 28 in the aforementioned one direction. However, in response to release of the knob 28, the torsion spring 202 is operative to effect rotation of the pinion cylinder 52 in an opposite direction, to cause the return of the rack gear segment 200 toward the initial position into abutment with the main rack gear 40 which is also returned to the initial position during such return movement of the torsion spring 202. During this return movement of the rack gear 40, the rotation of the control wheel 66 is operative to effect actuation of an electrical switch unit, as will be hereinafter more fully described.

Figure 10:
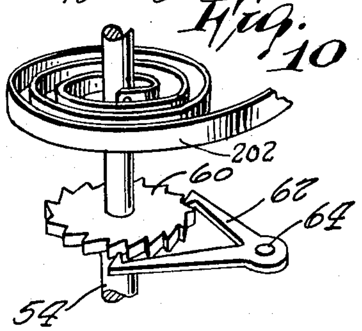
FIGURE 10 is a fragmentary perspective view of still other operating parts of the present invention.
Figures 11, 12, 13, 14, 15, 16:
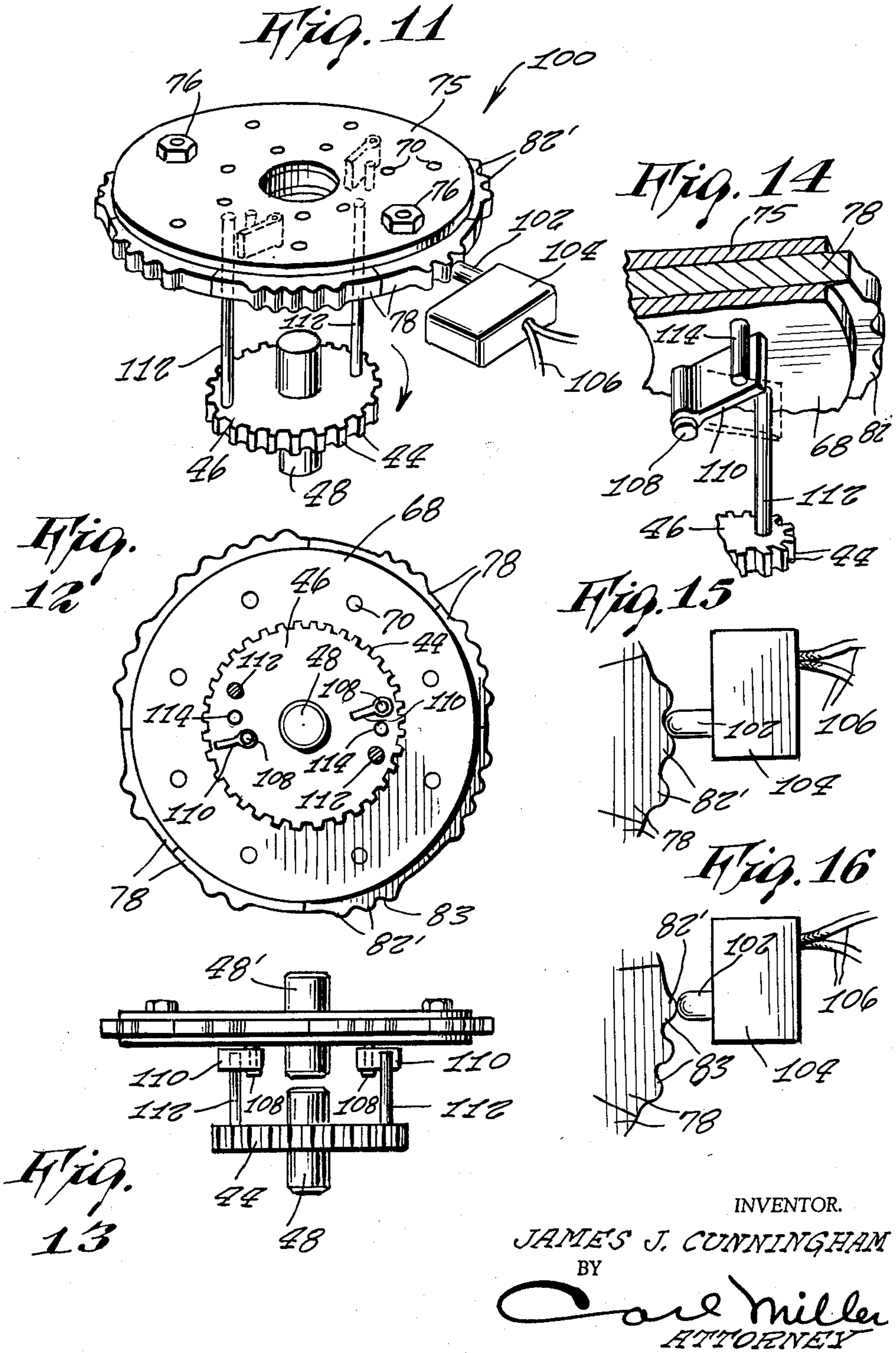
FIGURE 11 is a fragmentary perspective view of a slightly modified form of control mechanism.
FIGURE 12 is a bottom plan view of certain parts of the structure shown in FIGURE 11.
FIGURE 13 is a front elevational view of the assembly shown in FIGURE 11.
FIGURE 14 is a fragmentary bottom perspective view of certain parts of the clutch mechanism forming a part of the structure shown in FIGURES 11 to 13.
FIGURE 15 is a fragmentary plan view of certain parts of the structure shown in FIGURE 11 with the switch in a normally circuit closed position.
FIGURE 16 is a view similar to FIGURE 15, with the switch in a circuit open position.

However, as is more clearly shown in FIGURE 10 of the drawing, a pallet 62 and associated ratchet wheel 60 are provided for exerting a braking action which will retard the return movement of the pinion cylinder 52 so that the switch element is actuated at a relative uniform speed. While the pallet 62 mounted upon a pivot pin 64 is shown as one means of providing such braking action, it is to be understood that other types of braking elements, such as friction brakes, may be provided for this purpose.

Figure 7:
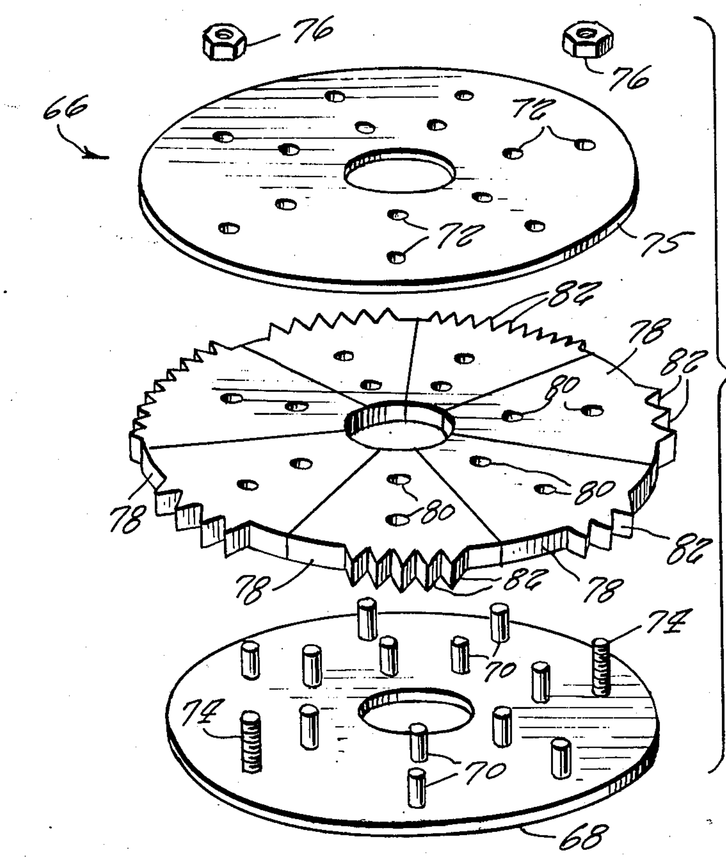
FIGURE 7 is an exploded perspective view of a dial control wheel assembly forming an operating part of the present invention.
Figure 8:
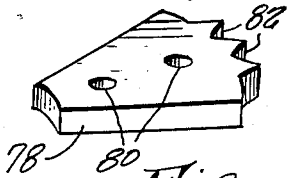
FIGURE 8 is a perspective view of one of the segments of the wheel shown in FIGURE 7.
Figure 9:
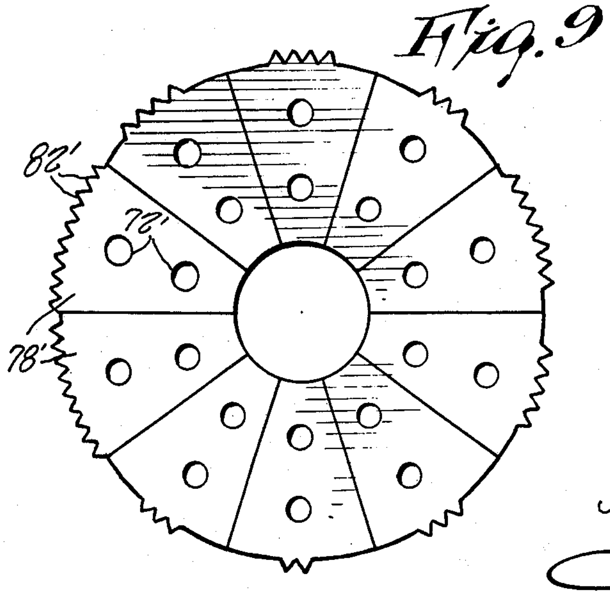
FIGURE 9 is a plan view of a slightly modified type of control wheel unit for use in automatic long distance dialing equipment.

Referring now more specifically to FIGURES 4 and 7 of the drawing, a control wheel assembly 66 made in accordance with one form of the present invention is shown to be mounted upon a shaft 48 that is rotatably received at one end within a bearing 47 and has a retractable detent 51 at the opposite end that releasably secures it within a socket 55 of an open bearing 53, thus enabling such shaft 48 to be readily removed for changing the character of the control wheel 66. However, each such control wheel 66 includes a base plate 68 with a plurality of circumferentially spaced apart pairs of radially spaced apart pins 70 that are received by corresponding openings 72 in a top plate 75. Certain ones of the pins are in the form of threaded studs 74 which serve to secure the base plate 68 and top plate 75 together, such as by nuts 76. Sandwiched between the base and top plates 68, 75, are seven segments 78, each of which is provided with a pair of openings 80 for receiving the positioning pins therethrough and peripheral detents 82 that actuate a one way trip plate 84 pivotally mounted upon a hinge pin 86 and associated with a trip lever 88. The lever 88 is operative to depress the plunger 90 of an impulse switch 92 having lead lines 94 which may be connected to the telephone circuit. While rotation of the control wheel 66 in the one direction caused by the manual movement of the knob 28 and rack gear 40 actuates the one way trip plate 84 without actuating the plunger 90 of the switch 92, rotation of the control wheel 66 in the opposite direction by the return movement of the rack gear 40 by the torsion spring 50 enables the detents 82 to actuate the plunger 90 one time for each one of the detents 82 carried by each segment. It will also be noted that the control wheel will be so positioned at the start of the operation, that the first proper segment which provides the first digit of the number to be dialed will be adjacent the plunger 90, and the following digits will be obtained by the segments being arranged in sequence corresponding to the digits. It will now be recognized that each such segment 78 represents one digit of a seven digit telephone number, the number of such detents 82 carried by each segment identifying the particular digit of the number. Therefore, by selecting segment plates 78 having the proper number of detents 82 and arranging them upon the control wheel 66, as shown in FIGURE 7, the mechanical equivallent of the telephone number can be readily reproduced for making and breaking the circuit through the switch 92 in a well known manner. In FIGURE 9 of the drawing, a ten digit telephone number control wheel is shown wherein each segment plate 78′ has detents 82′ and mounting holes 72′ so as to enable the control unit to be used for automatically dialing long distance telephone numbers on newer dialing equipment.

In FIGURES 1 to 5, the unit is shown to include a plurality of assemblies, each one of which may be set to automatically dial a separate number. These assemblies are mounted within the housing in spaced apart parallel relationship. However, in FIGURE 6 of the drawing, a slightly modified form of construction is shown in which the assemblies are mounted in spaced apart staggered relationship for conserving space and providing more compactness. In this embodiment, corresponding parts are identified by the same reference numerals associated with the aforementioned arrangement, for purpose of clarity. However, because of the staggered relationship between certain parts, the control knobs **28*a*, 28*b* are provided with plungers 34*a*, 34*b*** of different lengths.

Reference is now made to FIGURES 11 through 16 of the drawing, which illustrate a modified type of control wheel assembly and driving mechanism 100. In this embodiment, which utilizes a control wheel substantially identical to that illustrated in FIGURE 7 of the drawing, the control wheel is caused to rotate only in response to rotation of the pinion shaft 48 and pinion 46 in one direction, while during rotation of such pinion 46 in the opposite direction, clutch means are provided for maintaining the control wheel in an initial position. The detents 82′ of the control wheel are more blunt and serve as cams for effecting longitudinal movement of the plunger 102 of each make-break switch 104 that controls the dialing system through the associated lead wires 106. The clutch unit includes a pair of diametrically oppositely disposed pins 108 that are integral with the bottom plates 68 of the control wheel and which pivotally support stop elements 110 that are movable into abutment with slightly spaced apart pins 114. The pinion 46 includes a pair of diametrically opposite drive pins 112 that are rotatable into abutting relationship with the stops 110. As is clearly shown in FIGURE 12 of the drawing, rotation of the pinion 46 of the drive pins 112 in one direction is operative to bypass the stops 110, thus allowing the control wheel to remain in a stationary position. However, rotation of the pinion 46 and drive pins 112 in the opposite direction causes the stops 110 to abut with the spaced pins 114 and thus serve as a positive stop for abutment with the drive pins 112, so as to carry the control wheel therewith. It is during rotation of the control wheel at this time that the detents 82′ effect actuation of the plunger 102 of the make-break switch 104. As a result, this clutch mechanism takes the place of the one way trip plate 84 described in connection with FIGURES 1 to 5 of the drawing which is movable to a displaced position **84*a* with effecting actuation of the switch plunger 90 during the first movement of the knobs 28. It will be further noted by particularly referring to FIGURE 15, that the plunger 102** acts as a clutch to assist in maintaining the control wheel in its proper position.

It will now be recognized that a system has been provided which can be readily adapted to all types of domestic, industrial, and commercial types of installations for automatically dialing predetermined numbers in a simple and efficient manner. One of the main features of the present invention is that the control wheels may be conveniently removed and reset at any desired time.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. An automatic dialing attachment for dial telephones comprising, in combination, a rigid housing having a central compartment, a closure removably carried by said housing, an electrical impulse producing switch means, said switch means being supported within said housing, said switch means including mechanical means movable between circuit open and circuit closed positions to produce electrical impulses, rotatable means mounted within said housing, said rotatable means actuating said mechanical means, linear slide means carried by said closure for imparting motion to said rotatable means, said rotatable means comprising a circular wheel, a plurality of interchangeable segments carried by said circular wheel facilitating a connection with a telephone in the dial system, each one of said interchangeable segments carried by said wheel having a predetermined number of peripheral projections in sliding engagement with said mechanical means, said linear slide means comprising a plunger slidably carried by said closure for reciprocating longitudinal movement, and gear means acting between said plunger and said wheel translating said sliding movement of said plunger into rotational movement of said wheel.

2. An automatic dialing attachment as set forth in claim 1, wherein said switch means includes a plurality of said electrical impulse producing switches and associated actuating means mounted in side by side relationship.

3. An automatic dialing attachment as set forth in claim 1, wherein said switch means includes a plurality of said electrical impulse producing switches and associated actuating means mounted in oppositely facing staggered relationship.

4. An automatic dialing attachment as set forth in claim 1, wherein said gear means comprises a rack gear slidably supported within said housing for reciprocating longitudinal movement, a pinion carried by said wheel, and said plunger having means for effecting longitudinal movement of said rack gear in one direction.

5. An automatic dialing attachment as set forth in claim 4, further comprising spring means for effecting longitudinal movement of said rack gear in an opposite direction.

6. An automatic dialing attachment as set forth in claim 5, wherein said mechanical means comprises a one way trip plate responsive to actuate said switch means in response to rotation of said wheel in said opposite direction only.

7. An automatic dialing attachment as set forth in claim 1, wherein said gear means comprises a rack gear slidably supported within said housing for reciprocating longitudinal movement, a pinion mounted concentric with said wheel for rotation independently thereof, said plunger having means for effecting longitudinal movement of said rack gear in one direction to effect rotation of said pinion in one direction, spring means for effecting movement of said rack gear in an opposite direction to effect rotation of said pinion in an opposite direction, and one way clutch means acting between said wheel and said pinion for effecting rotation of said wheel with said pinion in said opposite direction of rotation of said pinion only.

8. An automatic dial attachment as set forth in claim 7, wherein said mechanical means comprises a plunger supported for reciprocating longitudinal movement between a normal outer circuit closed position and an inner circuit open position, and said plunger slidably engaging said peripheral projections of said wheel for actuation in response to rotation of said wheel in said opposite direction.

References Cited in the file of this patent

UNITED STATES PATENTS

| | | |
|---|---|---|
| 2,086,110 | Allen | July 6, 1935 |
| 2,032,229 | Servanton | Feb. 25, 1936 |
| 2,036,037 | Goff | Mar. 31, 1936 |
| 2,063,830 | Rouse | Dec. 8, 1936 |
| 2,890,287 | Goldschmidt | June 9, 1959 |